(12) United States Patent
Fisher

(10) Patent No.: US 6,217,186 B1
(45) Date of Patent: Apr. 17, 2001

(54) ILLUMINATED DISPLAY SYSTEMS

(75) Inventor: James Fisher, Sydney (AU)

(73) Assignee: Eleven Lighting Pty. Limited, Sydney ( * ) Notice: Subject to any disclaimer, the term of this patent is extended or adjusted under 35 U.S.C. 154(b) by 0 days.

(21) Appl. No.: 09/269,398

(22) PCT Filed: Sep. 26, 1997

(86) PCT No.: PCT/AU97/00650

§ 371 Date: Jan. 10, 2000

§ 102(e) Date: Jan. 10, 2000

(87) PCT Pub. No.: WO98/12690

PCT Pub. Date: Mar. 26, 1998

(51) Int. Cl.[7] .................................................. F21V 8/00
(52) U.S. Cl. ............................................................. 362/31
(58) Field of Search ........................................ 362/31, 26

(56) References Cited

U.S. PATENT DOCUMENTS

| 5,390,436 | * | 2/1995 | Ashall | 362/31 X |
| 5,433,024 | * | 7/1995 | Lerner | 362/31 X |
| 5,641,219 | * | 6/1997 | Mizobe | 362/31 |
| 5,711,589 | * | 1/1998 | Oe et al. | 362/31 |

FOREIGN PATENT DOCUMENTS

| 2064288 | 2/1989 | (AU) . |
| 8622691 | 4/1992 | (AU) . |
| 6187894 | 11/1994 | (AU) . |
| 4045095 | 7/1996 | (AU) . |
| 506116 | 9/1992 | (EP) . |
| 561329 | 9/1993 | (EP) . |
| 2253301 | 9/1992 | (GB) . |

* cited by examiner

Primary Examiner—Laura K. Tso
(74) Attorney, Agent, or Firm—Birch, Stewart, Kolasch & Birch, LLP

(57) ABSTRACT

An illuminated display assembly including a transparent sheet of material such as an acrylic including: at least one surface forming at least one edge of the sheet and first and second outer surfaces separated by said at least one surface; a light source which delivers light via said at least one edge surface through and along the plane of the sheet and intermediate the outer surfaces; wherein, one or both of said outer surfaces as applied thereto at least one half tone translucent array arranged so as to distribute the light from said light source across said at least one or both surfaces of the sheet wherein said at least one half tone array covers a substantial part of the entire first or second surfaces with the remainder of the surface free of said array or arrays thereby increasing the intensity of light issuing from the display particularly in the region remote from the light source to at least fifty percent more than the light which issues by comparison from a display of like or substantially the same dimensions incorporating a dot matrix.

10 Claims, 2 Drawing Sheets

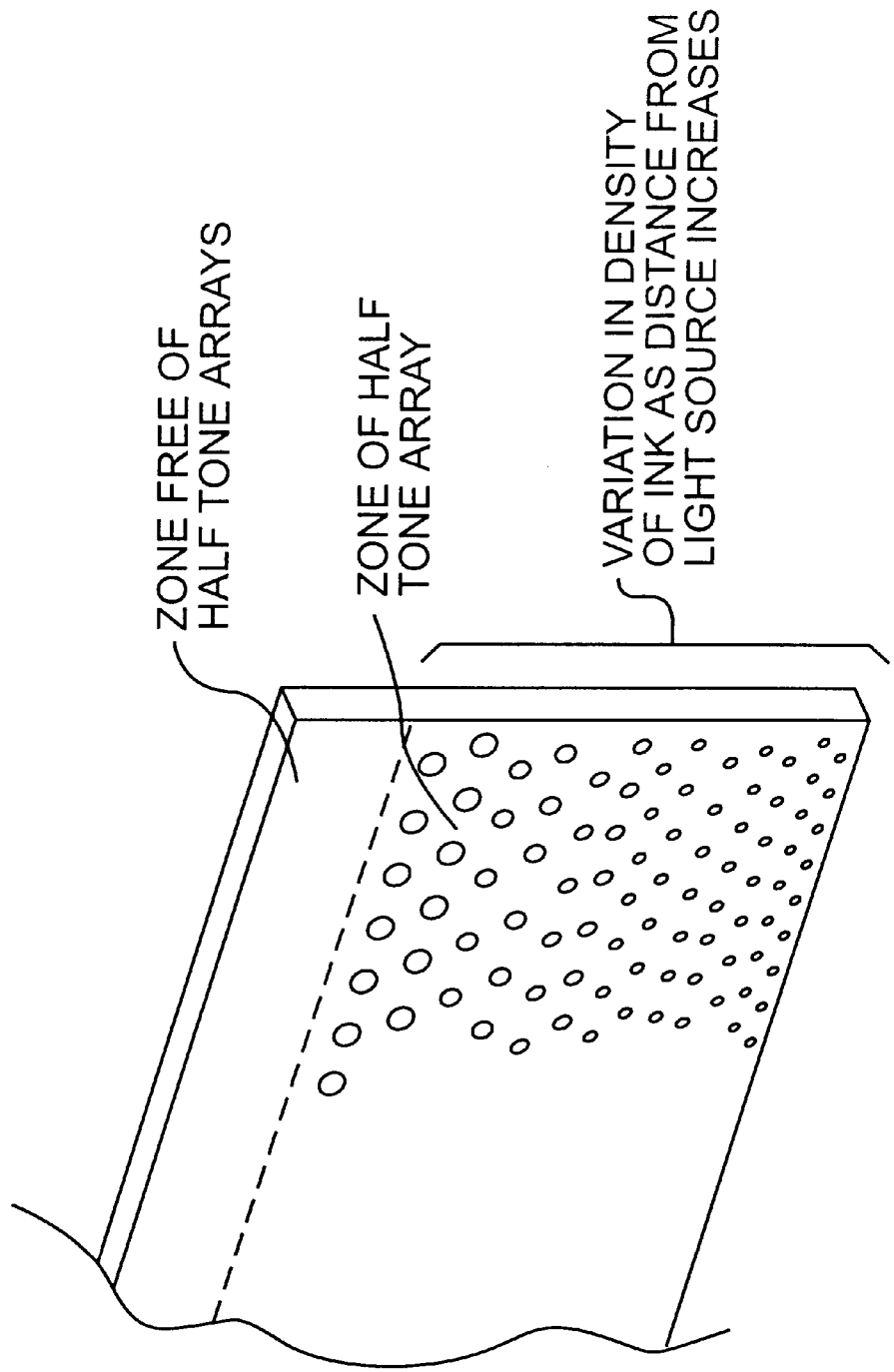

ILLUMINATED DISPLAY SYSTEMS

Figure 1:
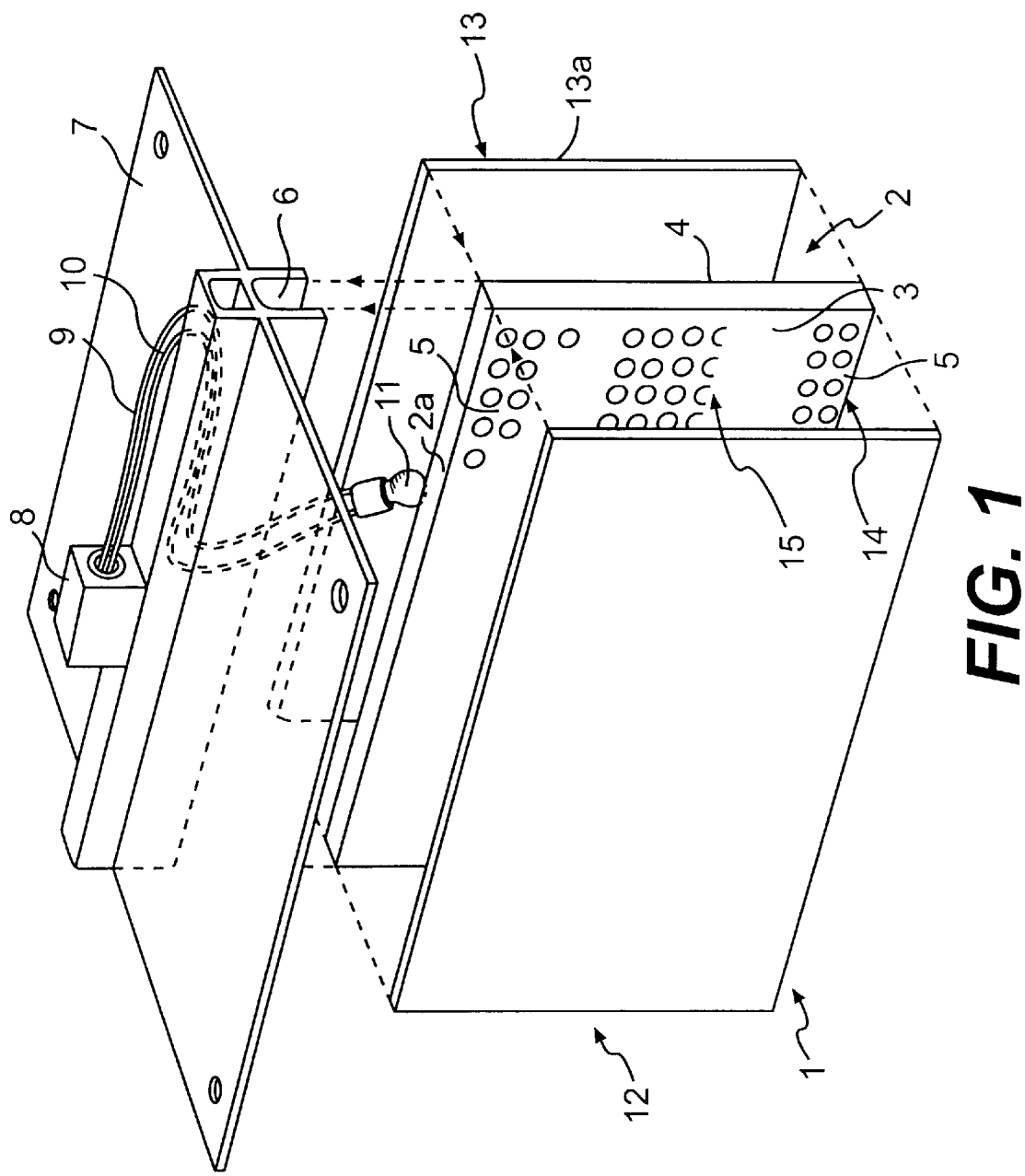

This application is the national phase under 35 U.S.C. §371 of PCT International Application No. PCT/AU97/00650 which has an International filing date of Sep. 26, 1997 which designated the United States of America.

1. Background of the Invention

The present invention relates to display systems and more particularly relates to an illuminated display system which utilises a matrix of half tone arrays.

2. Prior Art

Australian patent 647834 by Ashall discloses a display system which comprises at least one transparent sheet having two opposing surfaces wherein at least one of these surfaces has a matrix of dots applied to the surface. That specification clearly indicates a preference that both surfaces which are to be illuminated be adapted with a matrix of dots applied to the respective surfaces to achieve the appropriate degree of refraction and reflection along the sheet from the light source to the point on the sheet most remote from the light source.

This patent specification sets out a table which compares the parameters of sign size, distance from the light source that the light from the illumination source must travel and a light meter reading (lux) taken midway between the light source and the end of the display sign most distant from the light source with the light meter readings being dependent upon whether one or both sides of the sheet is adapted with the matrix of dots. It is clear from the table in that patent specification that the two sided embodiment of the application of the dot matrix is preferred and indeed is indicated as providing more light particularly midway from the light source. This phenomenon is repeated as the area of the sheet increases and as the distance from the light source that the light must travel increases.

For larger sheet sizes where the light must travel a greater distance from the source, the light meter readings are lower but clearly the light intensity is greater when a two sided matrix is used.

SUMMARY AND OBJECTS OF THE INVENTION

The inventor has found that it is possible to dramatically increase the light intensity emanating from a sign or the like by using a particular form of matrix applied on one surface of a sheet of material which forms the sign compared with the light intensity emanating from an identical sized sheet having a dot matrix applied to both of two opposite sides of the sheet. This means that the sign can be produced more cheaply and with less material whilst at the same time the light intensity is increased by at least 50% in comparison to a sheet forming a sign of substantially like size with a dot matrix pattern applied to two opposing surfaces of the sheet.

It is an object of the invention to provide an illuminated sign wherein the sign comprises a sheet of transparent material such as glass or perspex which when a half tone array is applied to one surface and in the presence of a light source emits light at a greater intensity in comparison to that which would be emitted by a sign of the same or substantially the same size with a dot matrix applied to at least two surfaces of the sheet.

In its broadest form, the present invention comprises:

an illuminated display assembly comprising; a transparent sheet of material such as an acrylic comprising;

at least one surface forming at least one edge of the sheet and first and second outer surfaces, separated by said at least one surface, a light source which delivers light via said at least one edge surface through and along the plane of the sheet and intermediate the outer surfaces; wherein, at least one of said outer surfaces has applied thereto at least one half tone translucent array arranged so as to distribute the light from said light source across said at least one or both surfaces of the sheet wherein said at least one half tone array covers a substantial part of the entire first or second surfaces with the remainder of the surface free of said array thereby increasing the intensity of light issuing from the display particularly in the region remote from the light source to at least fifty percent more than the light which issues by comparison from a display of like or substantially the same dimensions incorporating a dot matrix.

In another form the present invention comprises;

an illuminated display system comprising; a transparent sheet of material such as an acrylic, including first and second outer surfaces;

a light source which delivers light along the plane of the sheet and between the outer surfaces via an edge surface of the sheet; wherein one of said outer surfaces has at least one half tone translucent array arranged on said surface so as to distribute the light across said first or second surfaces of the sheet; wherein said at least one half tone array covers a part of the entire surface of said first or second outer surfaces with the remaining part including a region free of half tones thereby increasing the intensity of light issuing from the display in the region remote from the free region compared to that which would issue from the same region were a dot matrix array used.

Preferably the light is evenly distributed across the outer surface. According to a preferred embodiment the display system is manufactured utilizing an acrylic sheet which is sandwiched between two outer layers which carry some form of message to be illuminated. The display system includes a light source and a support means for attaching the display system to a support structure. The light shines through the thickness dimension of the acrylic sheet along the plane of the material which has two large faces through which light from the light source is reflected via the matrix of half tone translucent arrays. The half tone matrix is arranged in such a way that the light is evenly distributed over the outer surface area of the acrylic sheet. The half tone arrays are not dots as described in patent 647834 previously mentioned. The referenced prior art document does not teach that it is possible to place a matrix of half tone translucent arrays on one side of the sheet to actually increase the light intensity compared to the dot matrix described on two sides of the sheet.

Preferably the half tone array covers a substantially part of the entire first and/or second outer surfaces. Thus, the present invention actually decreases the extent of the matrix necessary to effect refraction and reflection of the light within the sheet yet with at least a 50% increase in intensity thereby reducing time and labour and cost involved in producing the sign.

According to a preferred embodiment the region free of half tone array or arrays is located at or near the upper region of the first or second surfaces adjacent the illumination or light source. This has the effect of preventing refraction of light in the upper portion of the display so that by internal reflection increased illumination is achieved via the arrays which refract the light and facilitate an even distribution of light over the surface area of the display over the area of the half tone array.

According to the prior art dots are used and in the preferred embodiment of the invention disclosed in patent 647834 they were used on both sides of the acrylic sheet.

The unique matrix of half tone translucent arrays according to the present invention results in a 50% increase in light intensity for up to a 50% reduction in overall surface area of the matrix.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESRIPTION OF THE DRAWINGS

The present invention will become more fully understood from the detailed description given hereinbelow and the accompanying drawings which are given by way of illustration only, and thus are not limitative of the present invention, and wherein:

FIG. 1: shows an exploded view of a display system according to a preferred embodiment of the invention; and FIG. 2: shows a half toned matrix array according to one embodiment of the invention.

DETAILED DESCRIPTION OF THE PREFERRED EMBODIMENTS

Referring to FIG. 1 there is shown an isometric view of a display system according to a preferred embodiment of the invention. Display system 1 comprises an acrylic sheet 2 of a predetermined thickness having outer surfaces 3 and 4 onto which is arranged a matrix of half tone translucent arrays which act in evenly distributing light across the surface of the sheet on which the matrix is placed. Sheet 2 which is a transparent acrylic material is accommodated in a channel shape member 6 of a support member 7. Support member 7 also houses the light source which may, according to one embodiment, comprise power source 8 linked via electrical wires 9 and 10 to a light emitting bulb 11. When the display assembly is fixed together it is preferred that the light source and in particular bulb 11 transmits its light from edge to edge of transparent sheet 2.

According to the preferred embodiment, the display system incorporates additional panels which preferably comprise smokey translucent opal acrylic material. The outer layers 12 and 13 may comprise signage which will be illuminated when light emanates via surfaces 3 and 4. Layer 12 for instance, may have a sign printed on its outer exposed surface. Likewise, layer 13 may have a sign printed on its outer surface 13a such that it can be read depending upon which direction the viewer is coming from. FIG. 1 indicates a gap between layers 12 and sheet material 2 for the purpose of showing the matrix 5 disposed on outer surface 3 of the acrylic material 2.

Whereas in the prior art the refraction and reflection of the light passing through the thickness of the acrylic material was controlled by means of dots and in particular varying the density thereof, according to the present invention outer surfaces 3 and/or 4 include a matrix of half tone arrays. The density of the half tones increases as the distance from the light source increases in order to facilitate increased refraction through the surface of the acrylic material to the outside of the sheet and to reduce or eliminate internal reflection.

The densities of the half tones can be adjusted according to the light intensity required over the surface of the acrylic material. In region 14 of surface 3 it will be noted that the matrix is translucent but incorporates an arrangement which enables complete refraction of the remaining light in that part of member 2. In region 15 the areas where the matrix does not cover the surface 3 allowing increased internal reflection of the light and reduced refraction. By adopting this technique it is possible to ensure that the light intensity over surface 3 is even over the whole surface. According to the prior art, in a typical case the acrylic surface material incorporated 20% dots nearest the light source increasing to 50% dots away from the light source. According to the present invention the matrix of half tone arrays comprises 10% to 50% nearest the light source increasing to 100% refractive surface at the furthest distance from the light source. Thus as light intensity decreases as distance from the light source increases the density of the half tone array/s increase/s to ensure maximum refraction remote from the light source.

Set out below is a table comparing the light intensity travelling through the acrylic material in a prior art display system and a display system according to the invention of equivalent size and dimensions.

|    | PRIOR ART (lumens) | PRESENT INVENTION (lumens) |
| --- | --- | --- |
| 1. | 224 | 294 |
| 2. | 176 | 310 |
| 3. | 119 | 234 |
| 1. | 285 | 269 |
| 2. | 230 | 346 |
| 3. | 146 | 294 |

This table indicates that for a selected size display system the light intensity of a prior art device is reduced in comparison to the light intensity emitted from a device in accordance with the present invention. It is the matrix half tone array of the present invention which is responsible for the increase in light intensity.

Referring now to FIG. 2 there is shown a sheet of acrylic material taken in isolation showing a possible half tone translucent array which will result in an increase in light intensity for an equivalent size sheet where a dot matrix is used. It will be appreciated that FIG. 2 shows one possible array of half tones and it will be obvious to persons skilled in the art that a variety of half tone arrays can be used to achieve the increased in light intensity when using only one surface of the acrylic sheet.

According to an alternative embodiment at or near the top of the display and more particularly closer to the illumination source is a zone free of the half tone array. This region according to one embodiment may fall within the region between the top of the display and 8 to 20 mm below the top. The region free of half tone array allows for total internal reflection of the light from the light source within the thickness of the sheet and along the plane of the transparent sheet. This enables available light to travel a greater distance from the light source to facilitate more even distribution of light across the surface of the sheet and allows more light refraction through the half tone arrays in the lower regions of the sign.

Varying the density of the arrays will increase or decrease light refraction as required.

Ideally the half tone arrays are concentrated on one side. According to one embodiment the arrays cover 50%–100% of the surface area of one surface of the sign. On the side bearing the half tone array about 75% of the available light is refracted through the ink on the half tone and about 25% is refracted on the side not having the half tone arrays.

The light intensity in a function of the light source type and the diameter of the bulb.

It will be recognised by persons skilled in the art that numerous variations and modifications can be made to the present invention without departing from the overall spirit and scope of the invention broadly described herein.

What is claimed is:

1. An illuminated display assembly including a transparent sheet of material such as an acrylic comprising:

at least one surface forming at least one edge of the sheet and first and second outer surfaces, separated by said at least one surface; and a light source which delivers light via said at least one edge surface through and along the plane of the sheet and intermediate said outer surfaces; wherein at least one of said outer surfaces has applied thereto at least one half tone translucent array arranged so as to distribute the light from said light source across said at least one of said outer surfaces of the sheet;

wherein said at least one half tone array covers a substantial part of at least one of said first and second outer surfaces with the remainder of the surface free of said array thereby increasing the intensity of light issuing from the display particularly in the region remote from the light source to at least fifty percent more than the light which issues by comparison from a display of substantially the same dimensions incorporating a dot matrix.

2. An illuminated display system comprising:

a transparent sheet of material such as an acrylic, including first and second outer surfaces;

a light source which delivers light along the plane of the sheet and between the outer surfaces via an edge surface of the sheet;

wherein one of said outer surfaces has at least one half tone translucent array arranged on said surface so as to distribute the light across at least one of said first and second outer surfaces of the sheet; wherein said at least on half tone array covers a part of the entire surface of said at least one of said first and second outer surfaces with the remaining part including a region free of half tones thereby increasing the intensity of light issuing from the display in the region remote from the free region compared to that which would issue from the same region were a dot matrix array used.

3. An illuminated display assembly according to claim 1 wherein as the intensity of light from said light source decreases as distance from the light source increases the density of said at least one half tone array increases to maximize refraction of light remote from said light source.

4. An illuminated display assembly according to claim 3 wherein the density of said at least one half tone array is 10% to 50% density over the surface area of the sheet increasing to 100% density at the furthest distance from the light source.

5. An illuminated display assembly according to claim 4 wherein said at least one half tone array is applied to a part of one of said outer surfaces of the sheet of material such that a region of that surface proximate the light source is free of said half tone array.

6. An illuminated display assembly according to claim 5 wherein at least one surface of said sheet is overlaid with panels bearing at least one of a figure, word message and symbol.

7. An illuminated display assembly according to claim 6 further comprising a support structure including a recess for receiving and supporting said sheet material.

8. An illuminated display assembly according to claim 7 wherein the support structure further comprises a junction for termination of a power supply and connection of said power supply to the light source.

9. An illuminated display assembly according to claim 8 wherein the light source is located in a recess in said support structure such that the light emanates from the light source about midway along the edge of said sheet which is retained by said support structure.

10. An illuminated display sign according to claim 9 wherein said at least one half tone array is randomly distributed over the outer surface of said sheet.

* * * * *